United States Patent

Ragaly

[11] Patent Number: 6,057,627
[45] Date of Patent: *May 2, 2000

[54] CLAW POLE GENERATOR WITH VENTILATION FAN SUPPORTING THE MAGNETIC POLE TIPS

[75] Inventor: Istvan Ragaly, Schwieberdingen, Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,271

[22] Filed: Jul. 9, 1997

[30] Foreign Application Priority Data

Aug. 9, 1996 [DE] Germany .............................. 196 32 219

[51] Int. Cl.[7] .............................. H02K 19/24; H02K 5/24; H02K 9/04
[52] U.S. Cl. .............................. 310/263; 310/181; 310/51; 310/62
[58] Field of Search .............................. 310/263, 181, 310/51, 62

[56] References Cited

U.S. PATENT DOCUMENTS

| | | | |
|---|---|---|---|
| 829,015 | 8/1906 | Johnson | 310/263 |
| 3,445,694 | 5/1969 | Campbell et al. | 310/263 |
| 5,132,581 | 7/1992 | Kusase | 310/263 |
| 5,543,676 | 8/1996 | York et al. | 310/263 |

FOREIGN PATENT DOCUMENTS

| | | | |
|---|---|---|---|
| 2 673 493 | 9/1992 | France . | |
| 1 209 671 | 10/1972 | Germany | 310/263 |
| 95/17033 | 6/1995 | Germany | 310/263 |
| 1-318532 | 12/1989 | Japan | 310/263 |
| 6-78479 | 3/1994 | Japan | 310/263 |

OTHER PUBLICATIONS

Patent Abstract of Japan, 01328532, Dec. 25, 1989, Honda Yoshiaki: "Rotor of Brushless AC Generator".
Patent Abstract of Japan, 06022481, Jan. 28, 1994, Hara Noriyuki: "Field Rotating Dynamo–Electric Machine".
Patent Abstract of Japan, 59194651, Nov. 5, 1984, Mase Akira: "Fan Mounting Structure of AC Generator for Vehicle".

*Primary Examiner*—Thomas M. Dougherty
*Assistant Examiner*—Karl E. Tamai
*Attorney, Agent, or Firm*—Michael J. Striker

[57] ABSTRACT

A claw pole generator has a drive shaft, two pole wheel halves arranged on the drive shaft and each having a disk-shaped plate and claw shaped magnet poles spaced from one another in a peripheral direction and having magnet pole tips, the magnet poles of one pole wheel half being inserted in intermediate spaces of the magnet poles of the other of the pole wheel halves, permanent magnet parts provided for a dissipation flux compensation and arranged in intermediate spaces of the plate, the magnet poles extending in a predetermined direction, and a mounting device connecting the magnet pole tips with a neighboring one of the plates, the magnet poles extending toward an outer edge of a neighboring one of the plates, the mounting device having vanes operating as an ventilation element.

4 Claims, 2 Drawing Sheets

CLAW POLE GENERATOR WITH VENTILATION FAN SUPPORTING THE MAGNETIC POLE TIPS

BACKGROUND OF THE INVENTION

The present invention relates to a claw pole generators.

Claw pole generators are known in the art. One of such generators is disclosed for example in the German patent 1 209 651. In this reference a claw pole generator has a drive shaft on which an excitation winding is arranged. A pole wheel half is mounted on the drive shaft at each longitudinal side of the excitation winding. Each pole wheel half includes a pole wheel disk also indicated as a plate, and a claw-shaped magnet pole which extends from an edge region of said plate in a longitudinal direction parallel to the drive shaft and identified as a claw. The both pole wheel halves are arranged so that the claws of one pole wheel half engage in the intermediate spaces formed between two neighboring claws of the other pole wheel halves. They surround the excitation winding.

An immovable stator is provided at a small radial distance from the claw. It is composed of metal plates which are provided with grooves and insulating from one another and which are assembled to form a plate pack. Windings of the stator winding are imbedded in the grooves. The axial length of the plate pack is identified as a so-called iron length and corresponds in the known generators substantially to the length of the claws.

The power characteristics of a claw pole generator depend on the iron length of the plate pack. In order to increase the power or reduce claw pole generators with maintaining the same power, research has been conducted to increase the iron length. However, the magnetic dissipation flux occurring between the neighboring claws increases and affects the desired power increase.

The negative action of the increasing dissipation flux can be reduced by the use of so-called permanent magnets in the region between two neighboring claws as proposed in the patent 1 209 651. However, the problem remains that the claw tips in the case of excessive length depending on high centrifugal forces expand radially outwardly and in the worse case collide with the plate pack of the stator.

SUMMARY OF THE INVENTION

Accordingly, it is an object of the present invention to provide a claw pole generator which avoids the disadvantages of the prior art.

In keeping with these objects and with others which will become apparent hereinafter, one feature of the present invention resides, briefly stated in a claw pole generator in which a magnet pole extends in a direction preferably up to the outer edge of the neighboring plate, and a mounting device is provided which connects the magnet pole tip with the neighboring plate.

When the claw pole generator is designed in accordance with the present invention, it makes possible an elongation of the iron length up to 170% over the conventional claw pole generators, without taking into account an expansion of the claw tips.

With the use of permanent magnetic parts between the claws and the elongation of the stator iron, a substantial power increase of the generator with the same size or a reduction of the size with the same power is provided.

In addition, when the claw pole generator is designed in accordance with the present invention, this advantageous claw vibrations are eliminated.

Since on the elongated claws mounting devices are arranged which in turn are connected with the neighboring plate, the claw tips are held reliably from a radial deviation under the action of centrifugal forces. Also, occurring vibrations on the claws can be avoided by means of the mounting device.

Preferably, the mounting device is formed by elongated strips composed of a non-magnetic material which are welded their one end on a claw tip and mounted with its another end on the plate. Point welding or laser welding can be preferable methods for mounting of the metal strips. It is to be understood that other mounting methods can be used as well.

In accordance with a further advantageous feature of the present invention, the mounting device can be formed as a holding disk which is mounted on the one hand on the outer end surface of the plate and fixed on the edge region of the claw tips. The use of a holding disk provides in particular an advantage during mounting of the claw pole generator.

Also, other mounting devices can be used as well. The only requirement is that the mounting devices must guarantee that the claw tips are secured against a radial expansion.

In accordance with a further especially advantageous embodiment of the invention, the metal strips or the holding disks are provided with vanes, for ventilation of the generator. Since such ventilation vanes are mounted directly under the winding body of the stator windings, an efficient cooling is possible.

The corresponding ventilator vanes can be formed in a simple way by punching and bending of the holding strips or the holding disks.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1A:
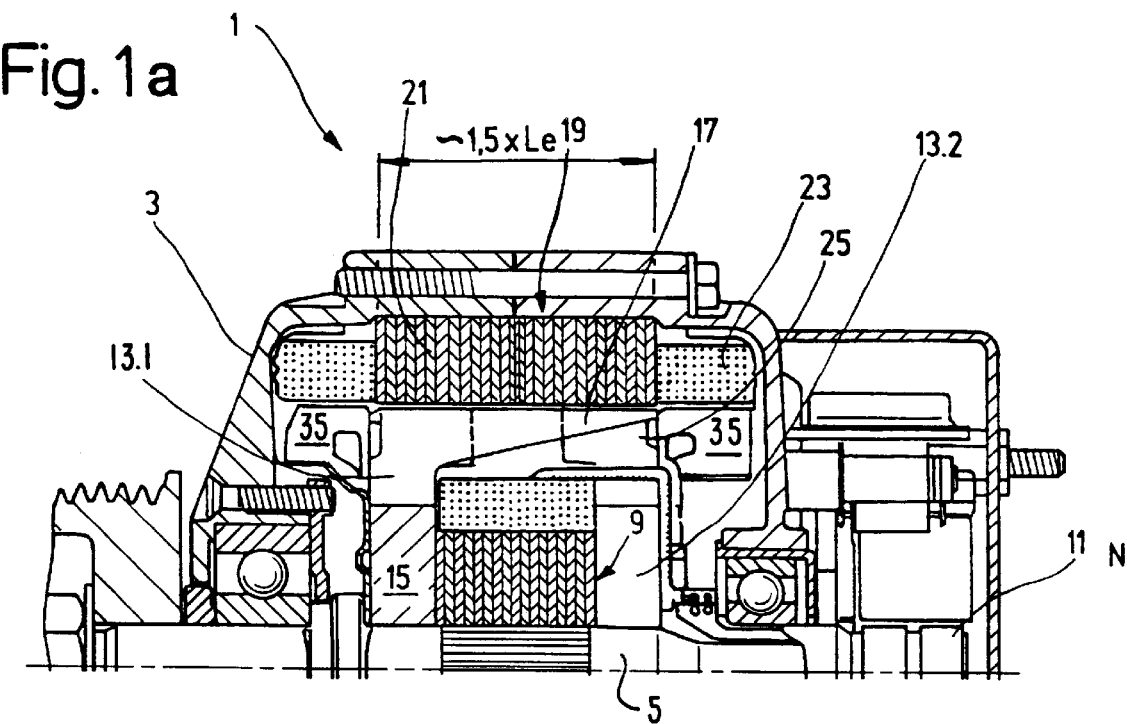
FIG. 1a is a schematic view of a claw pole generator with inventive claws.

FIG. 1 shows a claw pole generator which is identified as a whole with reference numeral 1. The generator has a housing 3 with a drive shaft 5 supported in the housing. A belt pulley 6 is mounted on an end of the drive shaft 5 located outside of the housing 3. It is driven for example through a wedge belt from the drive shaft 5. An excitation winding 9 is immovably mounted inside the housing of the drive shaft 5. It is provided with a relatively small excitation current through rings 11 which are also mounted on the drive shaft 5.

The excitation winding 9 is laterally surrounded by pole wheel halves 13.1 and 13.2. They are assembled on a pole wheel disk 15 which extends perpendicular to the drive shaft 5 and later on referred to as a plate, and also have a claw-shaped magnet poles 17 extending along the drive shaft 5 and known as short claws. Each pole wheel half 13 has a plurality of these claws 17 (the claw 17' in FIG. 1b) which are uniformly spaced from one another.

The both pole wheel halves 13 are oriented relative to one another so that the claws of the opposite pole wheel halves 13.1 and 13.2 engage in one other. In other words one claw of one pole wheel half is located in an intermediate spaced formed between two neighboring claws of the other pole wheel half. In the peripheral direction of the pole wheel south and north poles alternate when the exation winding 9 is supplied with current.

A non-rotatable stator 19 is radially spaced from the claws 17 of both pole wheel halves 13. It has for example a three-phase stator windings. The stator 19 is composed of plates which are insulated from one another and provided with grooves. The plates are compressed together to form a solid plate pack 21. The windings of the stator winding 23 are embedded in the grooves.

In operation, a magnetic flux is produced and extends through the core of the excitation winding 9, the so-called pole core, through the plates 15 and a claw 17 to the stator 19, and from there extends into the neighboring claw of the other pole wheel half and closes again through the plate 15. This magnetic flux which is identified as a useful flux is affected by a dissipation between neighboring claws 17 of the both pole wheel halves 13. In order to counteract this dissipation flux, permanent-magnet parts 25 are mounted in the intermediate spaces of the claws 17.

With the help of this permanent-magnet parts 25, the dissipation is so well taken care that an elongation of the claws 17 in the longitudinal direction is possible. In the same way also the length of the plate pack 13 can be increased with the result that the magnetic flux acting on the stator windings 23 is greater. The power of the generator is thereby increases, with the unchanged outer dimensions.

Figure 1B:
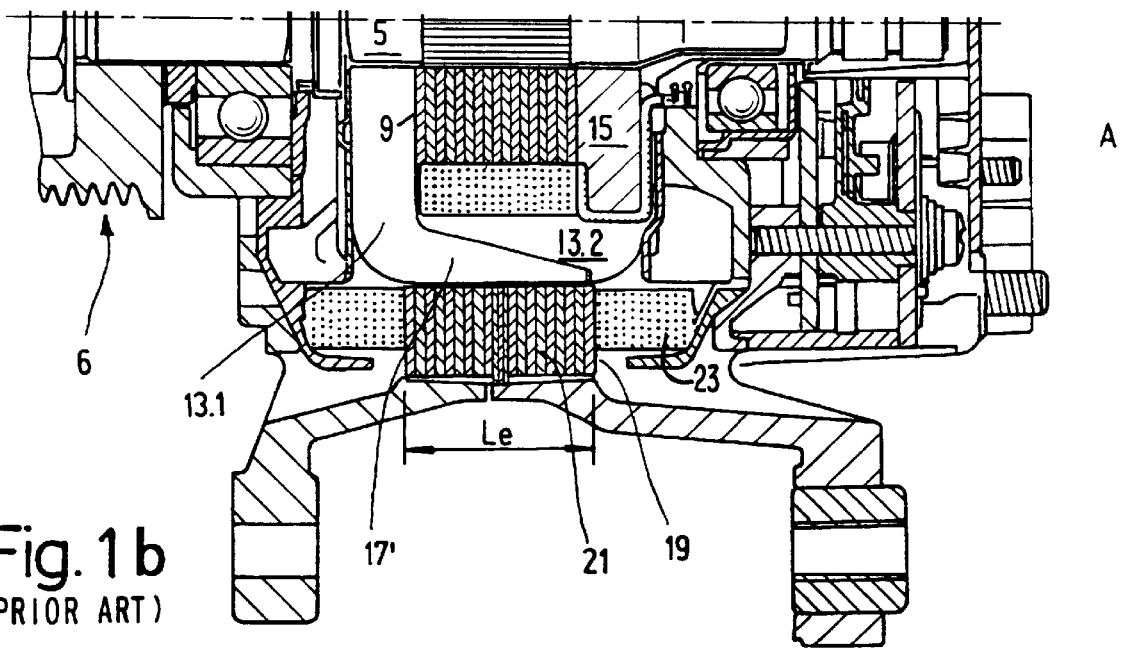
FIG. 1b is a view showing a claw pole generator in accordance with the prior art.

FIG. 1a shows the claw pole generator 1 with two different halves N and A. The upper part N correspondes to the inventive construction with elongated claws and elongated plate pack. FIG. 1b shows the lower half A of the claw pole generator in accordance with the prior art.

It can be recognized that the inventive plate pack has a length Le, also known as iron length, which is 1.5 times of the conventional iron plate of a plate pack. It has been determined that an elongation up to 1.7 times is possible.

With such an elongation of the claws 17 there is however a problem that with high rotary speeds, depending on centrifugal forces, a radial expansion occurs.

Depending on the air gap between the plate pack 21 and claws 17, this expansion leads to a collision between the claw and the plate pack and thereby in many cases a destruction of the generator. plate pack 13 can be increased with the result that the magnetic flux acting on the stator windings 23 is greater. The power of the generator is thereby increases, with the unchanged outer dimensions.

FIG. 1a shows the claw pole generator 1 with two different halves N and A. The upper part N correspondes to the inventive construction with elongated claws and elongated plate pack. FIG. 1b shows the lower half A of the claw pole generator in accordance with the prior art.

It can be recognized that the inventive plate pack has a length Le, also known as iron length, which is 1.5 times of the conventional iron plate of a plate pack. It has been determined that an elongation up to 1.7 times is possible.

With such an elongation of the claws 17 there is however a problem that with high rotary speeds, depending on centrifugal forces, a radial expansion occurs.

Depending on the air gap between the plate pack 21 and claws 17, this expansion leads to a collision between the claw and the plate pack and thereby in many cases a destruction of the generator.

In accordance with the present invention, a mounting device is provided which is described with reference to FIG. 2. The mounting device can have the function of taking the centrifugal forces acting on the claw tips, so as to prevent an expansion. From many possibilities, FIG. 2 shows five different embodiments of a mounting device 27.

Figure 2:
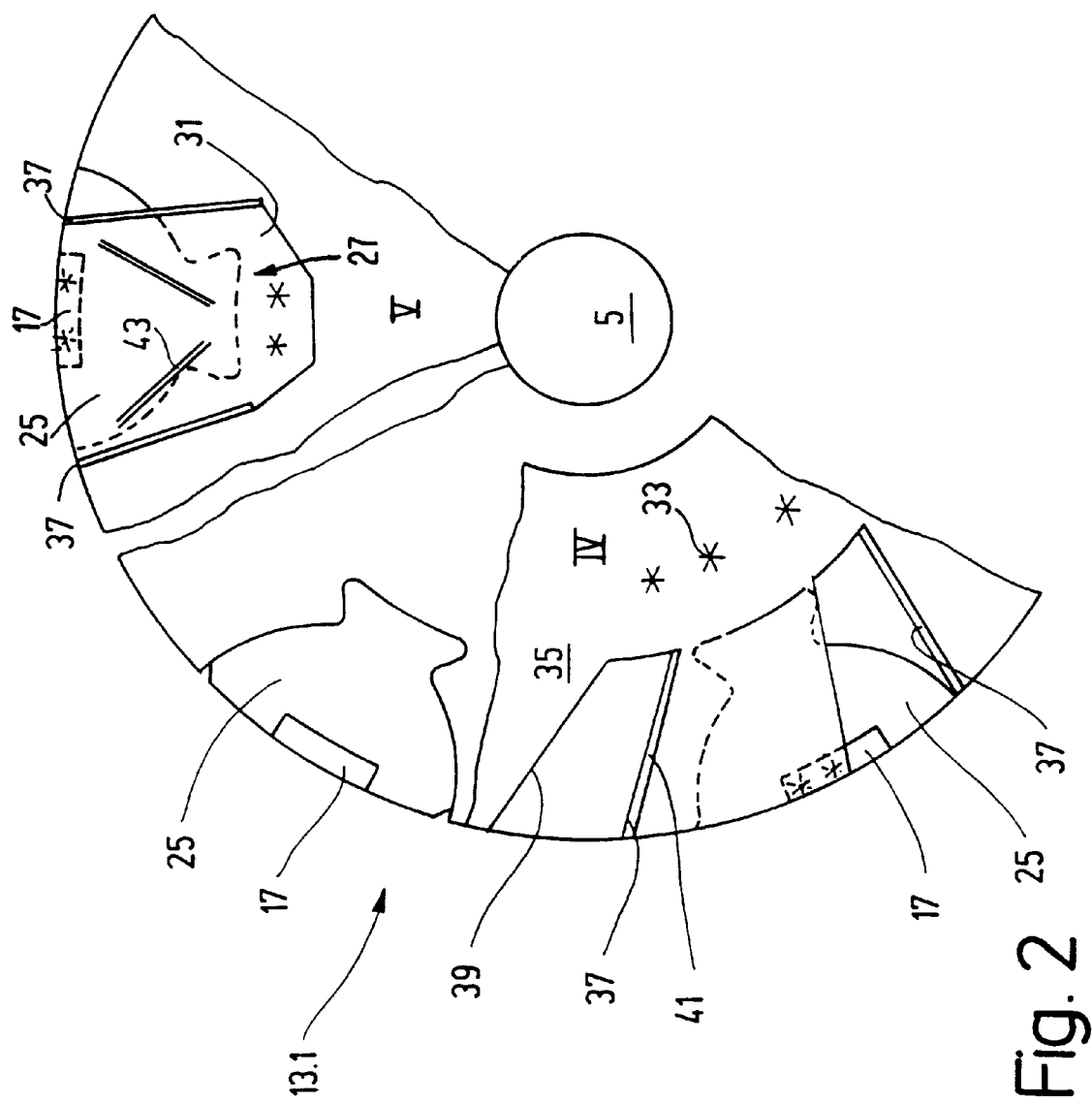
FIG. 2 is a view showing several embodiments of a mounting device in accordance with the present invention.

The outwardly facing end face of the plate 15 clearly shown in FIG. 2 has a well visible groove 29. The permanent-magnetic parts 25 are inserted in the groove 29. The claw 17 ends in the plane of the end surface. Only a claw tip is shown in FIG. 2 in a broken line.

In Example I, the mounting device 27 includes a plurality of elongated holding strips 31 corresponding to the number of claws. Their one end which is located radially outwardly is mounted on the end surface of the claw 17. Their other radially inner end is mounted to the plate 15. It is especially advantageous when the point welding or laser welding is utilized as a mounting process. Two welding points 33 is shown as an example on both ends in FIG. 2. Wherein the welding points are selected, it is necessary to take into consideration that they must be spaced at least two millimeters from the permanently magnetic parts 25 in order not to effect their magnetizing.

In Example II, the holding strips 31 are replaced by a holding disk 35. It is mounted for example on the drive shaft and connected in an edge region with the claw 17. The advantage of this design when compared with the holding strips is on the one hand a lower manufacturing expenses because of the smaller number of welding points, and on the other hand a higher strength.

In Example III, the holding disk 35 is additionally mounted by a welding point on the plate. It is to be understood that also several welding points per claw mounting are possible. In this way the holding disk 35 can be formed so that it no longer abuts against the drive shaft 5. In this case, the inner diameter of the holding disk is greater than the outer diameter of the drive shaft.

All above described Examples have the common feature in that the mounted devices 27 are composed of a non-ferromagnetic material. Brass, V-2A steel and other, non-ferromagnetic metals can be used as such a material.

In the Examples IV and V, the mounting devices 27 are formed as in the Examples 1 and 2, but in addition to the mounting, they perform further functions, namely the ventilation.

As shown in Example IV, ventilations vanes 37 are formed on the holding disk 35. Preferably, the holding disk 35 is cut along a vane outer contour line. Vanes 37 can be bent along a bending edge 41 perpendicularly to the plane of the drawing. Since because of the aerating function greater forces act on the holding disk 35, it is mounted on the plate 15 with more welding points 33.

It is to be understood that such vanes can be also formed on holding strips 31, as shown in the Example V. The holding strips are wider. The substantially radially extending edge regions are bent perpendicularly to the plane of the drawings to form the vanes 37. For increasing the strength, corrugations 43 are formed in the holding strips 31. In the shown example they are inclined. With such a design of the mounting device, an inwardly located ventilator can be formed in a simple manner.

In addition to the shown shapes of the vanes, also other, functionally similar solutions are possible.

It will be understood that each of the elements described above, or two or more together, may also find a useful application in other types of constructions differing from the types described above.

While the invention has been illustrated and described as embodied in claw pole generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A claw pole generator, comprising a drive shaft; two pole wheel halves arranged on said drive shaft, each said pole wheel half having a disk-shaped plate with a plurality of claws-shaped magnetic poles extending axially from said disk-shaped plate to form a magnetic tip, each said plurality of claw-shaped magnetic poles spaced from one another in a circumferential direction; wherein said magnetic poles of one pole wheel half being inserted in intermediate spaces of said magnetic poles of the other said pole wheel halves, and wherein said magnetic poles of said one pole wheel half ending with their magnetic pole tips in a plane through which an end surface of said disk-shaped plate of another of said pole wheel halves is defined which faces away from said one pole wheel half; permanent magnetic parts arranged in intermediate spaces of said magnetic poles to provide for a dissipation flux compensation; and a plurality of mounting devices, each said mounting device having a first end welded to one of said magnetic pole tips of said magnetic poles of one of said pole wheel halves and second end welded radially inside said first end to said end surface of said other disk-shaped plate which faces away from said one pole wheel half; said mounting device having vanes operating as ventilation element.

2. A claw pole generator as defined in claim 1, wherein said mounting device has a holding strip with one end fixed with the magnet pole tip and another end fixed on said plate.

3. A claw pole generator as defined in claim 2; and further comprising means for fixing said other end of said holding strip on said plate and including a welding means.

4. A claw pole generator as defined in claim 1, wherein said mounting device has circular ark-segment shape regions which are bent along an approximately radially extending edge outwardly and form ventilation vanes.

* * * * *